March 31, 1970     A. WACHTEL     3,503,894

EUROPIUM-ACTIVATED SILICA-ALUMINA PHOSPHOR AND METHOD

Filed Dec. 12, 1966

INVENTOR
Anselm Wachtel
BY
W. D. Palmer
ATTORNEY

United States Patent Office 3,503,894
Patented Mar. 31, 1970

3,503,894
EUROPIUM-ACTIVATED SILICA-ALUMINA
PHOSPHOR AND METHOD
Anselm Wachtel, Sayreville, Parlin, N.J., assignor to Westinghouse Electric Corporation, Pittsburgh, Pa., a corporation of Pennsylvania
Filed Dec. 12, 1966, Ser. No. 600,867
Int. Cl. C09k 1/54, 1/68; H01i 61/44
U.S. Cl. 252—301.4
12 Claims

ABSTRACT OF THE DISCLOSURE

Matrix of amorphous silica plus crystalline aluminosilicate is activated by europium. A gel precipitation method preferably is used to prepare the phosphor raw mix.

---

This invention relates to phosphor materials and, more particularly, to improved phosphor materials which are particularly adapted for use with discharge devices.

Phosphor materials which have good response to excitation by relatively short wavelength ultraviolet radiations, such as 254 nm., have utility in conjunction with fluorescent lamps, where the phosphor material converts the ultraviolet radiations into visible radiations. Such phosphors can be used either singly or in a blend to produce new color effects, or for making a lamp having improved brightness with a desired color.

Some other types of discharge devices produce longer wavelength radiations, such as 365 nm., and phosphor materials which respond to such radiations are useful with such discharge devices.

In copending application Ser. No. 403,389, filed Oct. 21, 1964, by Philip M. Jaffe, and owned by the present assignee, now Patent No. 3,359,211 is disclosed a europium-activated, silica-alumina phosphor wherein the molar ratio of silica to alumina in the matrix is preferably from 0.75:0.25 to 0.5:0.5. It has been found that this phosphor comprises two distinct phosphor compositions, as disclosed hereinafter. As will be described, these may be obtained in pure form by preparation of a homogeneous alumina-silica precipitate prior to firing. Only one of these compositions has an extremely good performance, for which the molar ratio of silica to alumina in the matrix is from 0.8:0.2 to 0.97:0.03. Such a phosphor exhibits superior performance and stability, and is excited by either shortwave or longwave ultraviolet to produce a bright blue emission, and the phosphor is also cathodoluminescent.

It is the general object of this invention to provide improved and optimized phosphor material which responds with a very bright blue emission to excitation either by short wavelength or long wavelength ultraviolet excitation.

It is another object to provide an improved method for making europium-activated silica-alumina phosphor which responds to ultraviolet radiations to provide a very bright blue emission.

It is an additional object to provide a europium-activated silica-alumina phosphor which can be modified with respect to its performance by the inclusion of impurity or additional activator.

The aforesaid objects of the invention, and other objects which will become apparent as the description proceeds, are achieved by providing a phosphor composition having a matrix which principally comprises silica-alumina and which includes europium as activator, at least a substantial part of which is in the divalent state. The relative proportions of silica to alumina are optimized as is the activator concentration. The phosphor emission can be varied by the inclusion of additional activator to supplement the europium. There is also provided a preferred method for preparing the phosphor composition by which the aluminum and europium are caused to co-precipitate as a hydroxide, with an organic silicon-containing compound closely associated with the precipitated hydroxide in the form of a gel. The silicon-containing compound is then hydrolyzed to silicic acid, after which the precipitate is washed and dried and fired in a controlled atmosphere. By this method there is provided the necessary control of the homogeneity and distribution of the raw-mix components used to form the phosphor.

For a better understanding of the present invention, reference should be had to the accompanying drawings wherein.

The present phosphor has a matrix which principally comprises silica and mullite and is expressible by the formula $xSiO_2 \cdot (1-x)Al_2O_3$ wherein $x$ is from 0.8 to 0.97. While the matrix is expressible as $xSiO_2 \cdot (1-x)Al_2O_3$, the silica and alumina combine in the approximate molar proportions $0.4SiO_2 \cdot 0.6Al_2O_3$ to form aluminosilicate, with excess of either component, originally present, remaining unreacted. This is confirmed by X-ray powder diffraction analyses which, for $x=0.4$ disclose the presence of pure aluminosilicate, more specifically, pure mullite. For the present phosphor in which $x$ is from 0.8 to 0.97, the relatively large amount of amorphous silica and the extremely small size of the crystalline mullite particles (about 100 A.) dispersed therein, cause the X-ray diffraction pattern of the mullite to be relatively weak and only the strongest lines manifest themselves, although when $x$ is 0.8, the pattern is sufficiently strong for a clear identification of mullite. When $x$ is 0.875, the mullite pattern is quite weak and when $x$ is 0.95, the mullite pattern is barely discernible. Mullite per se is generally expressed by the formula $xSiO_2 \cdot (1-x)Al_2O_3$, wherein $x$ is from 0.33 to 0.4.

The principal activator is europium, at least a substantial part of which is in the divalent state, and which is used in such amount that the ratio of gram-atoms of europium per gram-mole of silica plus alumina matrix is from 0.0005 to 0.0009. Solid-state reaction between $SiO_2$ and $Al_2O_3$ is extremely slow, and to prepare such a phosphor in an efficient fashion requires very careful control of the raw mix in order to obtain maximum possible dispersion of the silica, alumina, and europium, prior to firing.

Figure 1:
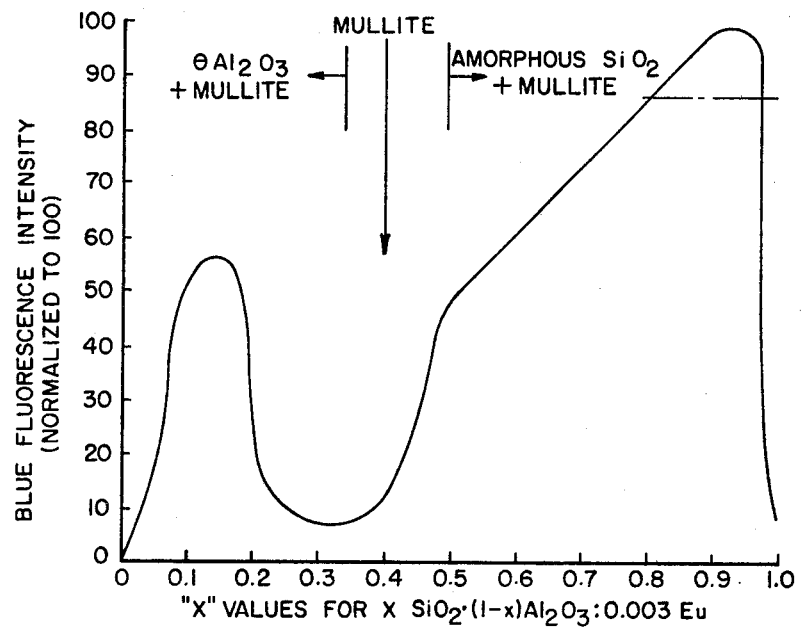
FIGURE 1 is a graph of blue fluorescence intensity versus relative gram-mole proportions of silica and alumina.

Referring to FIG. 1, it will be noted that the present phosphor system is unusual in that it is based on the coexistence of two dissimilar substances, one of which is mullite, and neither of which alone, constitutes a suitable host matrix for divalent europium. In the phosphor of this invention, the second substance is amorphous silica, and firing temperatures of 1350° C. to 1550° C. cause the silica to be transformed to α-cristobalite, which is to be avoided. At the preferred lower firing temperatures, from 1000° C. to 1330° C., solid-state reaction to form mullite does not take place at an appreciable rate, unless the two components are dispersed homogeneously as disclosed herein. It should be understood that other means of obtaining a homogeneous raw mix, such as an aluminum salt decomposable to the oxide, dissolved in a colloidal solution of silica, may be employed. Alternately, silica, alumina, and europium oxide in correct proportions, or salts decomposable to these oxides, may be fused at about 1600° C. or above and quenched to a glass prior to refiring in a reducing atmosphere, as will be described in detail hereinafter.

In the preferred method for preparing the present phosphor, there is first prepared a homogeneous aqueous-alcoholic solution of aluminum compound, europium compound and organic silicon-containing compound. The aluminum compound is selected so that in the presence of the (OH⁻) ion, aluminum hydroxide will be precipitated. The europium compound is also selected so that in the presence of the (OH⁻) iron, europium hydroxide will be precipitated. The organic silicon-containing compound is selected to be hydrolyzable in an alkaline solution containing sufficient water to form silicic acid. As a specific example, aluminum nitrate, europium nitrate and tetraethyl orthosilicate are preferred although other suitable compounds can be substituted for these. As an example, aluminum and/or europium chloride can be substituted for aluminum or europium nitrate and tetramethyl orthosilicate can also be substituted for the preferred tetraethyl compound. More specifically, 177 grams of $Al(NO_3)_3 \cdot 9H_2O$, 5.57 grams $Eu(NO_3)_3 \cdot 6H_2O$, and 603 grams of tetraethyl orthosilicate are dissolved in 60 ml. water plus 760 ml. of ethanol. The amount of alcohol is not particularly critical but is selected so that there is sufficient alcohol present to keep the silicon-containing compound in solution.

In the next step of preparation, there is added to the solution sufficient ammonium hydroxide to precipitate all of the aluminum and europium as a mixed aluminum-europium hydroxide. Preferably, the hydroxide is used in amount over and above that amount required to effect precipitation. The organic silicon-containing compound together with excess ammonia will be closely associated with the aluminum-europium hydroxide in the form of a gelatinous precipitate. More specifically to the foregoing alcoholic solution is rapidly added a mixture of 565 ml. of concentrated ammonium hydroxide and 1000 ml. ethanol, while stirring the solution vigorously. As noted hereinbefore, it is preferred that after the precipitation process, the alkaline-alcoholic solution of tetraethyl orthosilicate is substantially sorbed into or closely associated with the precipitate in order that residual solution will not form as a "supernatant" liquid in which silica may ultimately form as a physically segregated precipitate, although a small amount of supernatant alcoholic liquid can be tolerated.

Other solutions which contain the (OH⁻) ions may be substituted for the preferred ammonium hydroxide to precipitate the mixed aluminum-europium hydroxide. For example, other alkaline aqueous solutions can be used, such as quaternary ammonium hydroxides. If the precipitating hydroxide contains metallic cations, such as sodium hydroxide, the metallic cations should be removable by water washing at a later step in the processing.

The resulting gel is allowed to stand for a sufficient time to allow the organic silicon-containing compound to hydrolyze to silicic acid, for example, sixteen hours. The formed silicic acid is quite dense and contributes little to the apparent volume of the precipitate and is substantially contained within the aluminum-europium hydroxide network.

In the next step of preparation, the precipitate is separated and preferably water washed to remove substantially all alcohol and ammonium nitrate, then dried. The dried precipitate is then ground and fired in a reducing atmosphere at a temperature of from about 1000° C. to 1330° C. As a specific example, the precipitate is fired in a hydrogen atmosphere, which is preferred, or an ammonia atmosphere at a temperature of 1250° C. for a period of about 2 hours. The firing time will vary considerably depending upon the temperature and the batch size of the material being fired and as a general rule, the phosphor is normally fired for at least about one hour. In this example, the composition corresponds to $0.925SiO_2 \cdot 0.075Al_2O_3 : 0.004Eu$.

It is apparent that the reducing firing atmosphere as specified causes at least a substantial part of the europium to be in the divalent state. As a matter of practicality, it may be advantageous first to fire the phosphor raw mix, or precipitate as described hereinbefore, in air, followed by grinding and refiring in the reducing atmosphere. The preliminary firing in air is conducted at a temperature of from 1000° C. up to 1330° C., preferably 1250° C., followed by refiring in a reducing atmosphere at preferably 1100° C. While the preferred reducing firing atmosphere is hydrogen, it should be understood that a firing atmosphere such as ammonia, hydrogen plus nitrogen or ammonia plus nitrogen or other suitable reducing atmosphere can be used if desired.

A preliminary air firing has the additional advantage of removing any residual traces of carbonaceous material. If the preliminary air firing temperature is increased sufficiently to fuse the raw-mix material, any suitable raw-mix compounds which will result in a mixture of oxides can be used. As an example, silica, alumina, and europium oxide in the specified relative gram-mole proportions desired in the phosphor, or salts decomposable to these oxides, may be fused at about 1600° C. or above and then quenched to a glass, which is then fired in the reducing atmosphere, as specified. The maximum air-prefiring temperature should not exceed about 1750° C. for any appreciable period. More specifically, 61 gms. of silicic acid containing 91% by weight $SiO_2$, 11.7 grams of $Al(OH)_3$ and 1.78 grams of $Eu(NO_3)_3 \cdot 6H_2O$ are slurried with distilled water to form a stiff paste, dried, ground and heated in an oxidizing or inert atmosphere at a predetermined temperature for a sufficient time to fuse the raw-mix and produce a homogeneous material. For this specific raw-mix, a heating time of thirty minutes at 1600° C. in an air atmosphere will produce the melt. Thereafter, the melted material is rapidly cooled to form a solid glass. It is then ground, if a powder is desired, and refired in a reducing atmosphere, with hydrogen preferred, at a temperature of from 1000° C. to 1330° C., with a firing temperature of 1100° C. being preferred. The preliminary firing could also be conducted in nitrogen, for example, or in any atmosphere comprising oxygen, with air being preferred. The preliminary firing temperature should be from about 1600° C. to about 1750° C.

FIG. 1 shows the effect of varying the silica to alumina ratio on blue fluorescence intensity and the relative proportions of silica and alumina in the phosphor matrix are readily controlled by varying the proportions of these compounds in the initial alcoholic solution used to prepare the phosphor raw mix. This blue fluorescence intensity was measured with a commercial meter set to measure the "z" ICI coordinate intensity. As shown in FIG. 1, a minor peak is obtained when the molar ratio of silica to alumina is about 0.175:0.825. For best results of the material, however, the molar ratio of silica to alumina is from about 0.85:0.15 to 0.95:0.05. The optimum output of the phosphor occurs when the molar ratio of silica to alumina in a matrix is from about 0.9:0.1 to 0.95:0.05, or more specifically, about 0.925:0.075. The optimized phosphor is extremely efficient and under excitation by 254 nm., the quantum yield is extremely high. In preparing the various samples used in establishing the curve shown in FIG. 1, the europium concentration was maintained at 0.003 gram-atom per gram-mole of matrix.

The phosphor composition represented by the higher peak shown in FIG. 1, which is the phosphor of the present invention, contains divalent europium in a very stable form. The phosphor can be heated to as high as 800° C. without changing the valence of the europium. The phosphor composition as represented by the lower peak shown in FIG. 1 contains divalent europium in a relatively unstable form, which europium will oxidize when heated to relatively low temperatures, such as 100° C. Also, the composition represented by the lower, left-hand peak in FIG. 1 displays relatively poor maintenance when used in the usual fluorescent lamps, as compared to the composition represented by the higher peak shown in FIG. 1.

Figure 2:
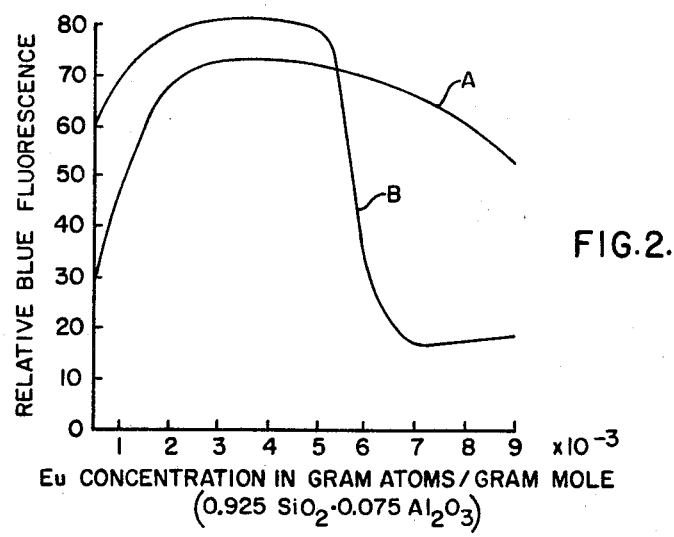
FIG. 2 is a graph of blue fluorescence intensity versus concentration of europium activator.

In FIG. 2 are shown curves of relative blue fluorescence intensity versus europium activator concentration. In both curves, the phosphor matrix had a silica to alumina molar ratio of 0.925:0.075. The phosphors used in taking curve "A" were prepared from raw mixes precipitated from 0.2 molar solutions (measured with respect to equivalent $SiO_2 \cdot Al_2O_3$ in solution) and ultimately fired in an ammonia atmosphere. The phosphor samples used in taking the curve "B" were prepared from two-molar solutions from which the raw mixes were precipitated and the raw mixes were ultimately fired in hydrogen. The europium is present in such amount that the gram-atom ratio of europium per gram-mole of matrix is from 0.0005 to 0.009 and the best phosphors will normally contain a europium concentration of from 0.002 to 0.005 gram-atom per gram-mole of matrix.

Figure 3:
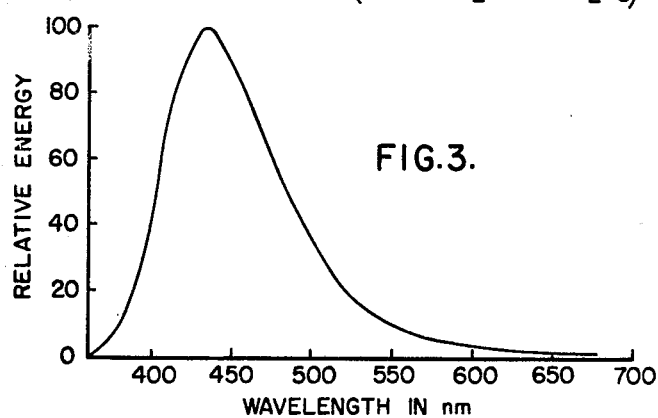
FIG. 3 is a graph of relative energy versus wavelength illustrating the spectral emission for the preferred phosphor embodiment.

The emission spectrum of the europium-activated silica-alumina phosphor is shown in FIG. 3. The fluorescence has a blue appearance and is extremely bright. As noted hereinbefore, under 254 nm. excitation, the phosphor exhibits an extremely high quantum efficiency which has been measured as 1.14 times that of commercial magnesium tungstate. The peak wavelength of emission depends on the europium concentration, shifting from 423 nm. at $1 \times 10^{-3}$ Eu to 455 nm. at $1 \times 10^{-2}$ Eu. For best response at about 3 to $4 \times 10^{-3}$ gram-atom europium per gram-mole of matrix, the emission spectrum peaks at about 435 nm., as shown in FIG. 3. The phosphor is also excited by 365 nm. excitation and under such excitation the peak shifts to longer wavelengths by about 5 to 7 nm. at low europium activator concentrations and by about 3 nm. at moderate or high europium concentrations. Also, for excitation by longer wavelength ultraviolet the maximum output occurs with a slightly higher europium content, specifically at about $5 \times 10^{-3}$ gram-atom per mole of matrix.

Selected impurities may be added to the phosphor in order to enhance the output somewhat. These impurities can readily be added to the washed precipitate, prior to drying. As an example, a nitrate solution of lithium, sodium, gallium, magnesium or calcium can be added to the washed precipitate and germanium can be added as an ammoniacal solution of germanium oxide. In a specific test, additive amounts of from $10^{-3}$ to $10^{-4}$ gram-atom per gram-mole of matrix, the lithium or sodium addition increased the output by more than 3%. Gallium or germanium when added to the matrix in amount of $10^{-4}$ atom per mole of matrix increased the output of the phosphor by about 1% and 2%, respectively. Magnesium or calcium when added to the phosphor in amount of $10^{-3}$ gram-atom per gram-mole of matrix increased the output of the phosphor by about 4% and 5%, respectively. The alkaline-earths also have the unusual effect of changing the bandwidth of the spectral energy distribution.

Other rare earths can be added to supplement the europium activator. Such other activators can be added as nitrates to the original alcohol solution. As an example, terbium activator used in amount of $4 \times 10^{-3}$ gram-atom per mole of matrix decreases the resulting bluish emission of the phosphor considerably, but introduces a longer wavelength emission which can vary from green-white to yellow-white to lavender-red, depending upon the final firing conditions and wavelength of the ultraviolet excitation. Dysprosium when used in similar amount to the terbium modifies the emission while decreasing the characteristic bluish emission of the phosphor and a lavender-blue to violet emission can be obtained, depending upon the firing conditions and the excitation. Other rare earths can also be used to supplement the europium with varying results, examples being praseodymium, neodymium, holmium, erbium, thulium, samarium or ytterbium.

It will be recognized that the objects of the invention have been achieved by providing a phosphor composition which responds very strongly to excitation either by short wavelengths or long wavelengths ultraviolet in order to produce a bright emission. Such phosphors are particularly useful in conjunction with fluorescent lamps or with other discharge devices which generate long wavelength ultraviolet radiations. There has also been provided a method for producing a very efficient and bright europium-activated silica-alumina phosphor.

While the foregoing phosphor has particular utility with discharge devices, the phosphor is also cathodoluminescent. In addition, the phosphor can be used in any application where it is desired to convert ultraviolet radiations into visible radiations, such as a fluorescent sign.

I claim as my invention:

1. A phosphor composition having an amorphous silica plus mullite matrix which under X-ray diffraction exhibits strong diffuse scattering plus the pattern of crystalline mullite, said matrix expressible as $xSiO_2 \cdot (1-x)Al_2O_3$, and including europium as activator, $x$ is from 0.8 to 0.97, the ratio of gram-atoms of europium per gram-mole of silica plus aluminum matrix is from 0.0005 to 0.009, at least a substantial part of said europium is in the divalent state, and there is also included in said phosphor additional metal as follows: from about 0.0001 to 0.001 gram-atom of lithium or sodium per gram-mole of matrix, about 0.0001 gram-atom of gallium or germanium per gram-mole of matrix, or about 0.001 gram-atom of magnesium or calcium per gram-mole of matrix.

2. A phosphor composition having an amorphous silica plus mullite matrix which under X-ray diffraction exhibits strong diffuse scattering plus the pattern of crystalline mullite, said matrix expressible as $xSiO_2 \cdot (1-x)Al_2O_3$, and including europium as activator, $x$ is about 0.9 to 0.95, the ratio of gram-atoms of europium per gram-mole of matrix is from 0.002 to 0.005, at least a substantial part of said europium is in the divalent state, and additional terbium or dysprosium activator is included in said phosphor in amount of about 0.004 gram-atom per gram-mole of matrix.

3. The method of preparing a phosphor composition having a matrix expressible as $xSiO_2 \cdot (1-x)Al_2O_3$, wherein $x$ is from 0.8 to 0.97, and which matrix is activated by europium in amount of from 0.0005 to 0.009 gram-atom per gram-mole of matrix, which method comprises:

(a) preparing a homogeneous aqueous-alcoholic solution of aluminum compound which in the presence of (OH$^-$) ions will precipitate aluminum hydroxide, europium compound which in the presence of (OH$^-$) ions will precipitate europium hydroxide, and organic silicon-containing compound which is hydrolyzable in an alkalizing aqueous solution to form silicic acid, with the relative atom proportions of europium, aluminum and silicon in said solution corresponding to those desired in said phosphor;

(b) adding to said homogenous solution an alkaline solution to form a gelatinous precipitate of said aluminum and europium as a mixed aluminum-europium hydroxide having in close association therewith an alkaline solution which includes said organic silicon-containing compound;

(c) hydrolyzing said organic silicon-containing compound to silicic acid; and (d) drying and then firing the resulting precipitate in a reducing atmosphere at a temperature of from about 1000° C. to 1330° C.

4. The method as specified in claim 3, wherein said aluminum compound is aluminum nitrate, said europium compound is europium nitrate, said organic silicon-containing compond is tetraethyl orthosilicate, and said alkaline solution is an ammonium hydroxide solution.

5. The method as specified in claim 3, wherein said precipitate is water washed after said organic silicon containing compound is hydrolyzed.

6. The method as specified in claim 3, wherein said precipitate is fired in an atmosphere comprising hydrogen or ammonia at a temperature of from 1000° C. to 1330° C. for at least about one hour.

7. The method as specified in claim 6, wherein prior to firing in said atmosphere comprising ammonia or hydrogen said precipitate is fired in air.

8. The method as specified in claim 7, wherein said firing in air is conducted at a temperature of from about 1000° C. to 1330° C.

9. The method of preparing a phosphor composition having a matrix expressible as $x\text{SiO}_2 \cdot (1-x)\text{Al}_2\text{O}_3$, wherein $x$ is from 0.8 to 0.97, and which matrix is activated by europium in amount of from 0.0005 to 0.009 gram-atom per gram-mole of matrix, which method comprises:
(a) preparing a raw mix of aluminum oxide, silicon dioxide and europium oxide, or compounds of these metals which will decompose on heating to their respective oxides, wherein the relative gram-atom proportions of aluminum, silicon and europium in said mix are those desired in said phosphor;
(b) heating said raw-mix in an inert atmosphere or an atmosphere comprising oxygen at a predetermined temperature and for a sufficient time to melt same and produce a homogeneous material;
(c) rapidly cooling said melt to form a glass;
(d) refiring said glass in a reducing atmosphere at a temperature of from 1000° C. to 1330° C.

10. The method as specified in claim 9, wherein said melt is rapidly cooled.

11. The method as specified in claim 9 wherein prior to refiring in said reducing atmosphere, said glass is reduced to finely divided status.

12. The method as specified in claim 9, wherein said initial heating of said raw-mix is at a temperature of from 1600° C. to 1750° C.

References Cited
UNITED STATES PATENTS 3,359,211   12/1967   Jaffe.

HELEN M. McCARTHY, Primary Examiner

R. D. EDMONDS, Assistant Examiner

U.S. Cl. X.R.

106—52, 65